(12) United States Patent
Tomita et al.

(10) Patent No.: US 10,984,952 B2
(45) Date of Patent: Apr. 20, 2021

(54) CAPACITOR

(71) Applicant: Panasonic Intellectual Property Management Co., Ltd., Osaka (JP)

(72) Inventors: Yukimitsu Tomita, Toyama (JP); Toshihisa Miura, Aichi (JP); Hiromasa Matsui, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/856,118

(22) Filed: Apr. 23, 2020

(65) Prior Publication Data
US 2020/0251282 A1 Aug. 6, 2020

Related U.S. Application Data

(63) Continuation of application No. PCT/JP2018/041800, filed on Nov. 12, 2018.

(30) Foreign Application Priority Data

Nov. 29, 2017 (JP) .............................. JP2017-228562

(51) Int. Cl.
*H01G 2/02* (2006.01)
*H01G 2/10* (2006.01)
(Continued)

(52) U.S. Cl.
CPC ............... *H01G 4/224* (2013.01); *H01G 4/38* (2013.01)

(58) Field of Classification Search
CPC ............ H01G 2/10; H01G 2/106; H01G 2/02; H01G 4/224; H01G 4/228; H01G 4/38; H01G 4/32
(Continued)

(56) References Cited

U.S. PATENT DOCUMENTS 8,228,660 B2 * 7/2012 Fujii ........................ H01G 2/08
361/274.1
9,107,319 B2 * 8/2015 Jeong ..................... H01G 4/224
(Continued)

FOREIGN PATENT DOCUMENTS

JP 2010-258343 11/2010
JP 2010258343 A * 11/2010 ............. H01G 4/224
(Continued)

OTHER PUBLICATIONS

International Search Report of PCT application No. PCT/JP2018/041800 dated Jan. 29, 2019.

*Primary Examiner* — Timothy J Thompson
*Assistant Examiner* — Guillermo J Egoavil
(74) *Attorney, Agent, or Firm* — McDermott Will and Emery LLP

(57) ABSTRACT

A capacitor includes a plurality of capacitor element units, a case housing the plurality of capacitor element units, a filling resin in the case, and an external connection bus bar. Each of the plurality of capacitor element units includes a capacitor element and a relay bus bar. The capacitor element has two end surfaces and a peripheral surface, and an electrode disposed on at least one of the two end surfaces. The relay bus bar includes an electrode connecting part connected to the electrode and a connection terminal disposed to face the peripheral surface. The external connection bus bar includes an internal connection terminal connected to the connection terminal and an external connection terminal being exposed from the filling resin and configured to connect to an external terminal. The plurality of capacitor element units are arrayed in the case along a first direction parallel to a bottom surface of the case.

7 Claims, 6 Drawing Sheets

(51) Int. Cl.
*H01G 4/228* (2006.01)
*H01G 4/224* (2006.01)
*H01G 4/38* (2006.01)

(58) Field of Classification Search
USPC .................................. 361/328, 301.3, 308.1
See application file for complete search history.

(56) References Cited

U.S. PATENT DOCUMENTS

| | | | |
|---|---|---|---|
| 10,079,098 B2* | 9/2018 | Sato | H01G 4/005 |
| 10,629,380 B2* | 4/2020 | Tadera | H01G 4/224 |
| 2007/0253146 A1* | 11/2007 | Inoue | H01G 11/76 |
| | | | 361/328 |
| 2013/0222967 A1* | 8/2013 | Imamura | H01G 2/04 |
| | | | 361/301.3 |
| 2018/0211782 A1* | 7/2018 | Kadomura | H01G 4/18 |
| 2018/0342354 A1* | 11/2018 | Imamura | H01G 4/228 |
| 2019/0080850 A1* | 3/2019 | Inazumi | H01G 4/33 |

FOREIGN PATENT DOCUMENTS

| | | | | |
|---|---|---|---|---|
| JP | 2014-170882 | | 9/2014 | |
| JP | 2014170882 A | * | 9/2014 | ............... H01G 2/10 |

* cited by examiner

CAPACITOR

RELATED APPLICATIONS

This application is a continuation of the PCT International Application No. PCT/JP2018/041800 filed on Nov. 12, 2018, which claims the benefit of foreign priority of Japanese patent application No. 2017-228562 filed on Nov. 29, 2017, the contents all of which are incorporated herein by reference.

BACKGROUND

1. Technical Field

The present disclosure relates to a capacitor.

2. Description of the Related Art

Conventionally, there has been known a so-called case-mold-type capacitor in which a capacitor element including electrode parts on both end surfaces is housed in a case, and an interior of the case is filled with a filling resin. In such a capacitor, a bus bar is electrically connected to the respective electrode parts of the capacitor element. An electrode connecting part of the bus bar, which is at a side close to the electrode part, includes, for example, an electrode terminal having a pin shape. This electrode terminal is connected to the electrode part by a jointing method such as soldering and welding. Further, the bus bar includes an external connection terminal. This external connection terminal is exposed from the filling resin filling the interior of the case and is connected to an external terminal of external equipment (device), on which the capacitor is mounted.

According to an arrangement space of the capacitor, which is prepared by the external equipment, a shape or a size of the case (up-down, front-rear, and left-right dimensions) is restricted. Capacitor elements of a number corresponding to necessary capacitance are arranged in the case. However, when a plurality of capacitor elements is arranged, an orientation and an arrangement direction of the capacitor elements are restricted by the shape or the size of the case.

For example, this problem occurs when a plurality of capacitor elements is arrayed in the case in such a direction that the electrode parts of the respective capacitor elements face each other. An example of a capacitor including capacitor elements arrayed in this manner is described in Unexamined Japanese Patent Publication No. 2010-258343.

The capacitor in Unexamined Japanese Patent Publication No. 2010-258343 includes a bus bar constituted by the first electrode plate and the second electrode plate, which are respectively provided with the first lead terminal and the second lead terminal as separate bodies. First ends of the first lead terminal and the second lead terminal are respectively connected to the electrode parts of the capacitor element by welding or the like, and second ends are respectively connected to the first electrode plate and the second electrode plate. In this capacitor, before a plurality of capacitor elements is arrayed in such a manner that the electrode parts of the respective capacitor elements face each other, the first lead terminal and the second lead terminal, which are the electrode connecting parts of the bus bar, can be respectively connected to the electrode parts of the capacitor element. Accordingly, it is not necessary to provide a gap for a working space of joining such as welding between the two electrode parts facing each other. Thus, the capacitor elements of the number according to the necessary capacitance can be arranged even when shape and size of the case are restricted.

SUMMARY

A capacitor according to an aspect of the present disclosure includes a plurality of capacitor element units, a case that houses the plurality of capacitor element units, a filling resin that fills an interior of the case, and an external connection bus bar. Each of the plurality of capacitor element units includes a capacitor element and a relay bus bar. The capacitor element has two end surfaces facing each other and a peripheral surface, and includes an electrode disposed on at least one of the two end surfaces. The relay bus bar includes an electrode connecting part connected to the electrode of the capacitor element and a connection terminal disposed to face the peripheral surface of the capacitor element. The external connection bus bar includes an internal connection terminal and an external connection terminal. The internal connection terminal is disposed in the case and connected to the connection terminal. The external connection terminal is exposed from the filling resin and configured to connect to an external terminal. The plurality of capacitor element units are arrayed in the case along a first direction parallel to a bottom surface of the case. The plurality of capacitor element units are arrayed so that the electrode of the capacitor element in a first capacitor element unit among the plurality of capacitor element units faces the electrode of the capacitor element in a second capacitor element unit among the plurality of capacitor element units. The first capacitor element unit and the second capacitor element unit are adjacent to each other.

The present disclosure can provide a capacitor that can be easily assembled when a configuration is adopted in which a plurality of capacitor elements is arrayed in a case in such a direction that electrodes of the respective capacitor elements face each other.

Effects or meanings of the present disclosure are further clarified in the following description of an exemplary embodiment. However, the exemplary embodiment shown below is merely an example of implementing the present disclosure, and the present disclosure is not at all limited to the examples described in the following exemplary embodiment.

DETAILED DESCRIPTION OF EMBODIMENT

Figure 1A:
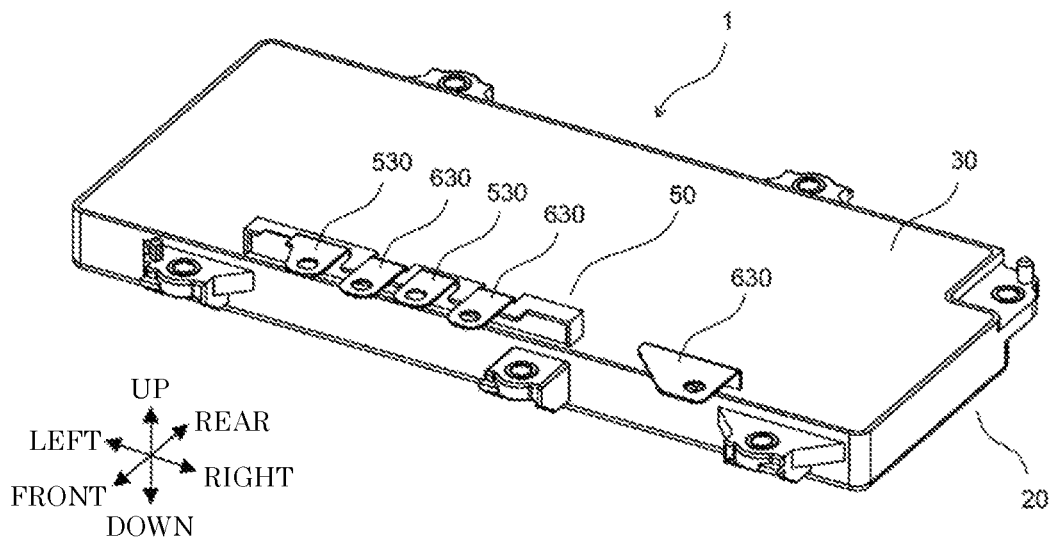
FIG. 1A is a perspective view illustrating a film capacitor according to an exemplary embodiment.

In the capacitor disclosed in Unexamined Japanese Patent Publication No. 2010-258343, one end of each of the first lead terminal and the second lead terminal needs to be connected to an electrode part of a capacitor element by welding or the like while another end is held. Since the first lead terminal and the second lead terminal are small parts, such work is likely to be very delicate.

Thus, the capacitor may not be easily assembled.

In the view of the above problem, the present disclosure provides a capacitor that can be easily assembled when a configuration is adopted in which a plurality of capacitor elements is arrayed in a case in such a direction that electrodes of the respective capacitor elements face each other.

With reference to the accompanying drawings, film capacitor 1, which is an exemplary embodiment of a capacitor of the present disclosure, will be described below. For the sake of convenience, directions including front and rear, left and right, and up and down are added to the drawings as appropriate. These directions are not absolute directions but relative directions in relation to an orientation of film capacitor 1.

In the present exemplary embodiment, electrode terminals 221, 321 correspond to an "electrode connecting part" described in the appended claims First connection terminal 230 and second connection terminal 330 correspond to a "connection terminal" described in the appended claims First external connection bus bar 500 and second external connection bus bar 600 correspond to an "external connection bus bar" described in the appended claims. First internal connection terminal 520 and second internal connection terminal 620 correspond to an "internal connection terminal" described in the appended claims. First external connection terminal 530 and second external connection terminal 630 correspond to an "external connection terminal" described in the appended claims Front first route L1F and rear first route L1R correspond to a "first route" described in the appended claims. Front second route L2F and rear second route L2R correspond to a "second route" described in the appended claims.

However, the above description is only intended to define correspondences between components in the claims and components in the exemplary embodiment. The correspondences described above do not limit the scope of the disclosure in the claims to the configuration described in the exemplary embodiment.

Figure 1B:
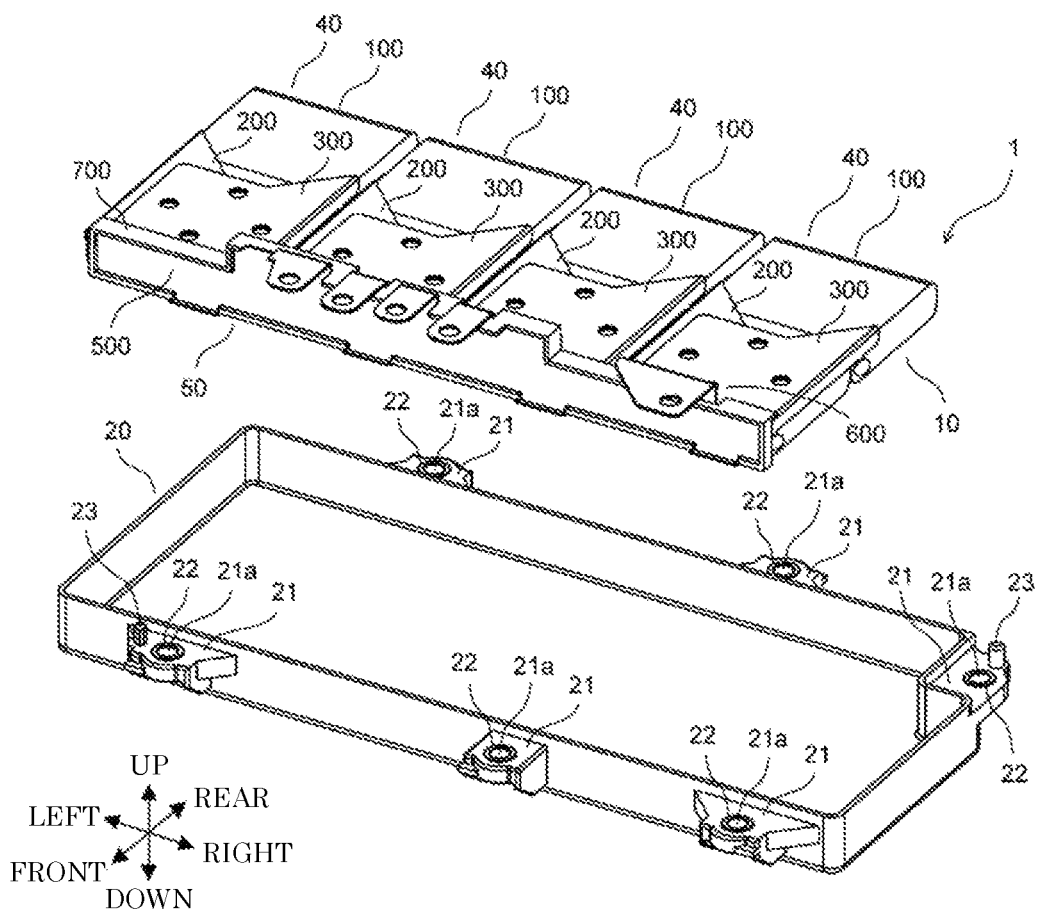
FIG. 1B is an exploded perspective view illustrating the film capacitor before a filling resin is filled according to the exemplary embodiment.

FIG. 1A is a perspective view illustrating film capacitor 1 according to the present exemplary embodiment. FIG. 1B is an exploded perspective view illustrating film capacitor 1 before filling resin 30 is filled according to the present exemplary embodiment.

As shown in FIG. 1A and FIG. 1B, film capacitor 1 includes capacitor assembly 10, case 20 that houses capacitor assembly 10, and filling resin 30 that fills an interior of case 20. Capacitor assembly 10 includes four capacitor element units 40 and bus bar unit 50 to which capacitor element units 40 are connected. While the interior of case 20 is molded by filling resin 30, a part of bus bar unit 50 including two first external connection terminals 530 and three second external connection terminals 630 is exposed from filling resin 30. Most part of capacitor assembly 10 embedded in filling resin 30 is protected from humidity or impact.

Case 20 is made of a resin material such as polyphenylene sulfide. Case 20 is formed into a substantially rectangular parallelepiped box shape, and a top surface of case 20 is open. An outer side of case 20 has attachment tabs 21 in three locations in front, two locations in rear, and at a right rear corner. Each of attachment tabs 21 has through hole 21a. Collar 22 made of metal is fitted in through hole 21a in order to increase strength of the hole. Case 20 has positioning pins 23 in attachment tab 21 at a left-hand side among the front attachment tabs 21 and in attachment tab 21 at the right rear corner.

Figure 2:
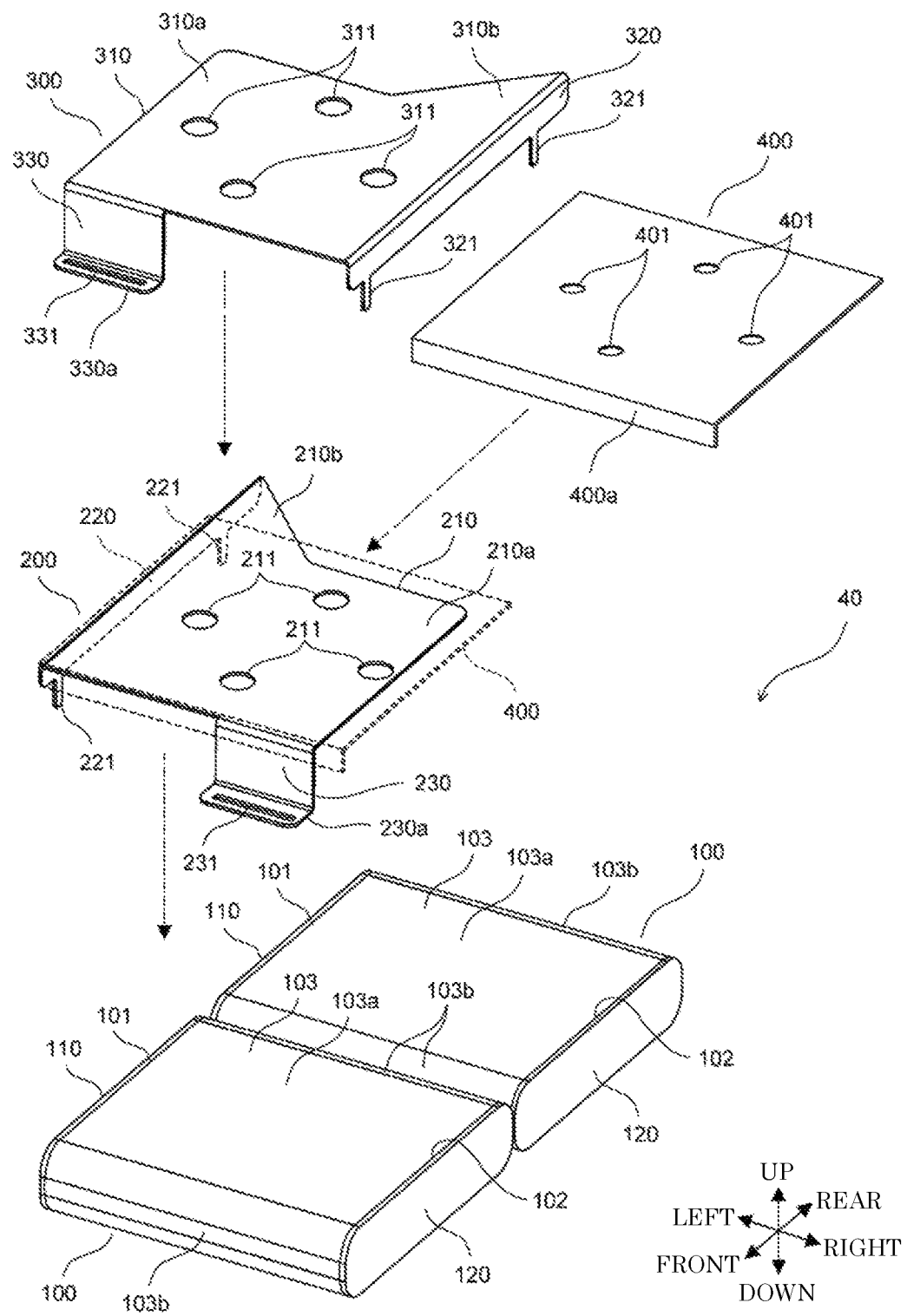
FIG. 2 is an exploded perspective view illustrating a capacitor element unit according to the exemplary embodiment.
Figure 3:
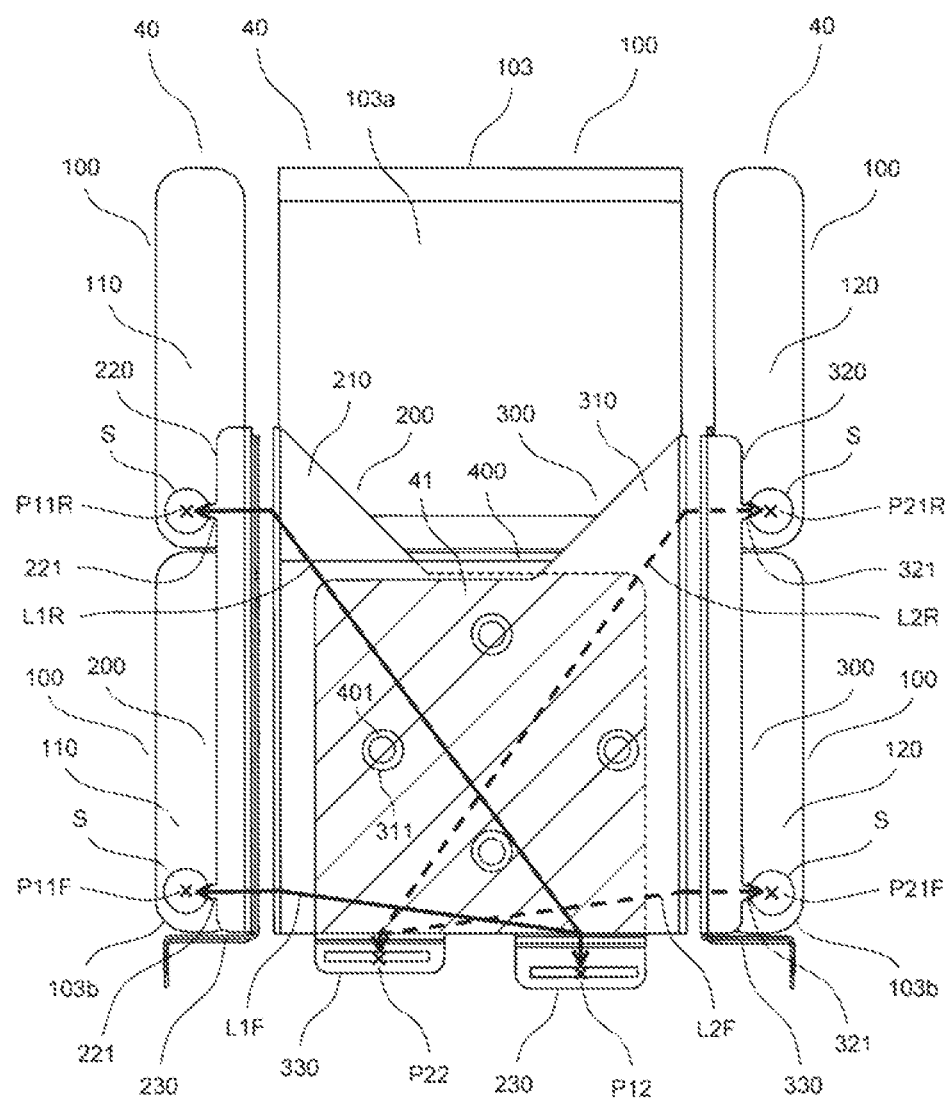
FIG. 3 is a view illustrating both a plan view and left and right side views, which are arranged close to each other, of the capacitor element unit according to the exemplary embodiment.

FIG. 2 is an exploded perspective view illustrating capacitor element unit 40 according to the present exemplary embodiment. FIG. 3 is a view illustrating both a plan view and left and right side views, which are arranged close to each other, of capacitor element unit 40 according to the present exemplary embodiment.

Capacitor element unit 40 includes two capacitor elements 100, first relay bus bar 200, second relay bus bar 300, and insulating sheet 400. In drawings of capacitor element unit 40 in a figure other than FIGS. 2 and 3, illustration of insulating sheet 400 is omitted.

Capacitor element 100 is formed by stacking of two metalized films in each of which aluminum is deposited on a dielectric film, winding or laminating of the stacked metalized films, and pressing of the wound or laminated metalized films into a flat shape. Capacitor element 100 has a substantially long cylindroid circular shape and includes two end surfaces 101, 102, and peripheral surface 103. Peripheral surface 103 includes two flat surfaces 103a that are parallel to each other and two curved surfaces 103b that connects flat surfaces 103a. Capacitor element 100 has, on one end surface 101, first end-surface electrode 110 formed by spraying of metal such as zinc, and in the same manner, on another end surface 102, second end-surface electrode 120 formed by spraying of metal such as zinc.

Although capacitor element 100 of the present exemplary embodiment is made of the metalized films in each of which aluminum is deposited on the dielectric film, capacitor element 100 may be made of metalized films in each of which other metal such as zinc and magnesium is deposited on the dielectric film. Alternatively, capacitor element 100 may be made of metalized films in each of which a plurality of metals among such metals is deposited on the dielectric film or be made of metalized films in each of which an alloy of such metals is deposited on the dielectric film.

First relay bus bar 200, which is made of a conductive material such as a copper plate, includes first main body 210, first electrode terminal 220, and first connection terminal 230. First relay bus bar 200 is formed by, for example, cutting out and bending of one copper plate as appropriate, and thus first main body 210, first electrode terminal 220, and first connection terminal 230 are integrally formed.

In first main body 210, main part 210a has a square plate shape and is provided with part 210b having a triangle plate shape, which protrudes rearward from a left side of a rear end portion of main part 210a. First main body 210 has four circular first openings 211. First electrode terminal 220 extends downward from a left edge of first main body 210 and has a plate shape elongated in a front-rear direction. At a lower end edge of first electrode terminal 220, first electrode terminal 220 has electrode terminals 221 at a front end and a rear end, respectively. Each of electrode terminals 221 has a pin shape protruding downward. First connection terminal 230 is disposed at a right end of a front end edge of first main body 210. And first connection terminal 230 extends downward from the front end edge of first main body 210, and is bent to form tip 230a extending frontward so that first connection terminal 230 has an L shape. Tip 230a of first connection terminal 230 has slit-shaped insertion hole 231.

Second relay bus bar 300, which is made of a conductive material such as a copper plate, includes second main body 310, second electrode terminal 320, and second connection terminal 330. Second relay bus bar 300 is formed by, for example, cutting out and bending of one copper plate as appropriate, and thus second main body 310, second electrode terminal 320, and second connection terminal 330 are integrally formed.

Second relay bus bar 300 has an approximately bilaterally symmetrical shape with respect to first relay bus bar 200. In second main body 310, main part 310a has a square plate shape and is provided with part 310b having a triangle plate shape, which protrudes rearward from a right side of a rear end portion of main part 310a. Second electrode terminal 320 is disposed at a right end edge of second main body 310, and second connection terminal 330 is disposed at a left end of a front end edge of second main body 310. Second main body 310 has four circular second openings 311. At a lower end edge of second electrode terminal 320, second electrode terminal 320 has electrode terminals 321 at a front end and a rear end, respectively. Each of electrode terminals 321 has a pin shape protruding downward. Second connection terminal 330 includes tip 330a having slit-shaped insertion hole 331.

Insulating sheet 400 is made of insulating paper or an insulating resin material such as acryl and silicone. And insulating sheet 400 has a rectangular shape. A size of insulating sheet 400 in a left-right direction is approximately equal to a size of capacitor element 100 in a direction connecting between the end surfaces of capacitor element 100 and is longer than a size of first main body 210 of first relay bus bar 200 and a size of second main body 310 of second relay bus bar 300 in the left-right direction. A size of insulating sheet 400 in a front-rear direction is longer than a size of main part 210a of first main body 210 and a size of main part 310a of second main body 310 in the front-rear direction. Insulating sheet 400 is bent to form front end 400a extending downward. Insulating sheet 400 has four third openings 401 in positions corresponding to first openings 211 of first relay bus bar 200 and second openings 311 of second relay bus bar 300.

When capacitor element unit 40 is assembled, two capacitor elements 100 are arranged in the front-rear direction such that curved surfaces 103b of respective capacitor elements 100 face each other, and first relay bus bar 200, insulating sheet 400, and second relay bus bar 300 are sequentially arranged from above on top of capacitor elements 100. First main body 210 of first relay bus bar 200 and second main body 310 of second relay bus bar 300 are disposed along flat surfaces 103a at an upper side of two capacitor elements 100. First openings 211 of first main body 210, second openings 311 of second main body 310, and third openings 401 of insulating sheet 400 are aligned with each other. Further, first electrode terminal 220 of first relay bus bar 200 is in contact with first end-surface electrodes 110 of two capacitor elements 100. And second electrode terminal 320 of second relay bus bar 300 is in contact with second end-surface electrodes 120 of two capacitor elements 100. Furthermore, first connection terminal 230 of first relay bus bar 200 is disposed on curved surface 103b of front capacitor element 100 at a front side and is located at a side close to second end-surface electrode 120. And second connection terminal 330 of second relay bus bar 300 is disposed on curved surface 103b of front capacitor element 100 at the front side and is located at a side close to first end-surface electrode 110.

As shown in FIG. 3, soldering is performed between one of electrode terminals 221 at front side of first electrode terminal 220 and first end-surface electrodes 110 of front capacitor element 100, and between the other of electrode terminals 221 at rear side of first electrode terminal 220 and first end-surface electrodes 110 of rear capacitor element 100. Thus, electrode terminals 221 and first end-surface electrodes 110 are fixed by soldering S and are electrically connected with each other. In the same manner, soldering is performed between one of electrode terminals 321 at front side of second electrode terminal 320 and second end-surface electrodes 120 of front capacitor elements 100, and between the other of electrode terminals 321 at rear side of second electrode terminal 320 and second end-surface electrodes 120 of rear capacitor elements 100. Thus, electrode terminal 321 and second end-surface electrode 120 are fixed by soldering S and are electrically connected with each other. Capacitor element unit 40 is completed in this way.

As shown by hatched lines area in FIG. 3, in capacitor element unit 40, overlapping portion 41, in which a part of first main body 210 of first relay bus bar 200 and a part of second main body 310 of second relay bus bar 300 overlap each other, is provided above peripheral surface 103 of front capacitor element 100, which is upper flat surface 103a. First main body 210 and second main body 310 are insulated by insulating sheet 400 disposed between first main body 210 and second main body 310.

In capacitor element unit 40, connection point P11F and connection point P12 are connected in a shortest route in first relay bus bar 200, which is front first route L1F shown by a solid line arrow. Here, connection point P11F is a point where electrode terminal 221 at the front side of first relay bus bar 200 is connected to first end-surface electrode 110 of front capacitor element 100. And connection point P12 is a point where first connection terminal 230 of first relay bus bar 200 is connected to first internal connection terminal 520 of first external connection bus bar 500. Further, connection point P21F and connection point P22 are connected in a shortest route in second relay bus bar 300, which is front second route L2F shown by a broken line arrow. Here, connection point P21F is a point where electrode terminal 321 at the front side of second relay bus bar 300 is connected to second end-surface electrode 120 of front capacitor element 100. And connection point P22 is a point where second connection terminal 330 of second relay bus bar 300 is connected to second internal connection terminal 620 of second external connection bus bar 600. Front first route L1F and front second route L2F intersect with each other in overlapping portion 41.

Similarly, connection point P11R and connection point P12 are connected in a shortest route in first relay bus bar 200, which is rear first route L1R shown by a solid line arrow. Here, connection point P11R is a point where electrode terminal 221 at the rear side of first relay bus bar 200 is connected to first end-surface electrode 110 of rear capacitor element 100. Further, connection point P21R and connection point P22 are connected in a shortest route in second relay bus bar 300, which is rear second route L2R shown by a broken line arrow. Here, connection point P21R is a point where electrode terminal 321 at the rear side of second relay bus bar 300 is connected to second end-surface electrode 120 of rear capacitor element 100. Rear first route L1R and rear second route L2R intersect with each other in overlapping portion 41.

In a conductive member of first relay bus bar 200, second relay bus bar 300, and the like, a current tends to flow through the shortest route as a property of current. Hence, each of front first route L1F, front second route L2F, rear first route L1R, and rear second route L2R is a main route for current flow.

A current in first relay bus bar 200 and a current in second relay bus bar 300 flow in mutually opposite directions. Hence, when overlapping portion 41 is disposed in first relay bus bar 200 and second relay bus bar 300, the currents flowing in the mutually opposite directions cancel an inductance component in first relay bus bar 200 and an inductance component in second relay bus bar 300. Consequently, an equivalent series inductance (ESL) in capacitor element unit 40 is reduced, resulting in a reduction in the ESL of film capacitor 1.

In particular, in overlapping portion 41 of capacitor element unit 40, front first route L1F and front second route L2F, and rear first route L1R and rear second route L2R, which are the main routes for current flows, intersect with each other. Hence, currents in the mutually opposite directions easily flow in positions close to each other, and thus an effect of cancelling the inductance components is enhanced. As a result, a reduction effect of the ESL in capacitor element unit 40 is enhanced.

Moreover, in capacitor element unit 40, electrode terminals 221 in the front and rear of first electrode terminal 220 are connected to front ends (close to curved surfaces 103b) of first end-surface electrodes 110 of front and rear capacitor elements 100, respectively. And electrode terminals 321 in the front and rear of second electrode terminal 320 are connected to front ends (close to curved surfaces 103b) of second end-surface electrodes 120 of front and rear capacitor elements 100, respectively. Meanwhile, first connection terminal 230 and second connection terminal 330 are located at the front side of front capacitor element 100. As a result, each of front first route L1F, front second route L2F, rear first route L1R, and rear second route L2R can be shortened. In this way, the main routes for current flows can be shortened in first relay bus bar 200 and second relay bus bar 300. Consequently, the ESL can be reduced.

In rear end parts extending toward rear capacitor element 100 in first main body 210 of first relay bus bar 200 and second main body 310 of second relay bus bar 300, even if overlapping portion 41 exists, a current flowing toward first end-surface electrode 110 of rear capacitor element 100 and a current flowing toward second end-surface electrode 120 of rear capacitor element 100 do not easily flow through overlapping portion 41. As a result, the ESL is expected to be hardly reduced. Hence, in the present exemplary embodiment, in first relay bus bar 200 and second relay bus bar 300, first main body 210 and second main body 310 are formed such that overlapping portion 41 does not exist in the rear end parts of first main body 210 and second main body 310. Consequently, the sizes of first relay bus bar 200 and second relay bus bar 300 are unlikely to wastefully increase, which enables reduction of material cost and weight of first relay bus bar 200 and second relay bus bar 300.

Figure 4A:
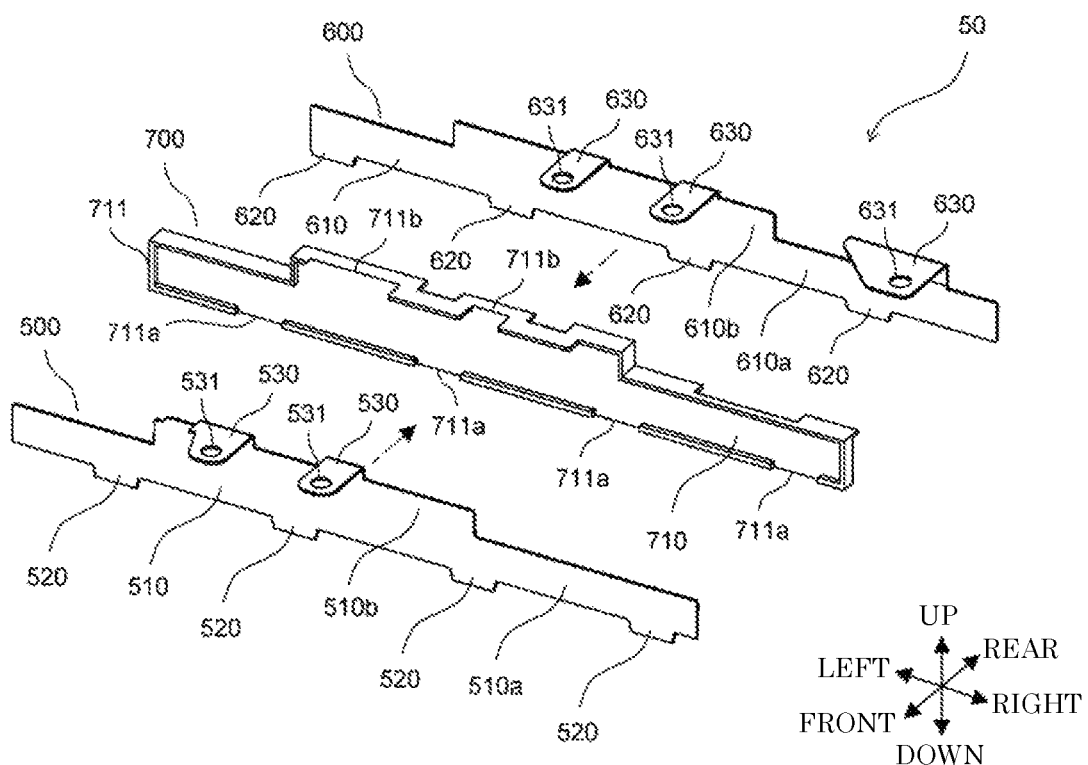
FIG. 4A is a front exploded perspective view illustrating a bus bar unit according to the exemplary embodiment.
Figure 4B:
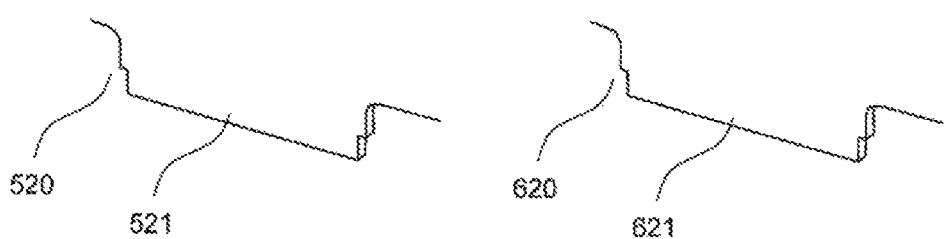
FIG. 4B is an enlarged perspective view illustrating a first internal connection terminal and a second internal connection terminal according to the exemplary embodiment.
Figure 4C:
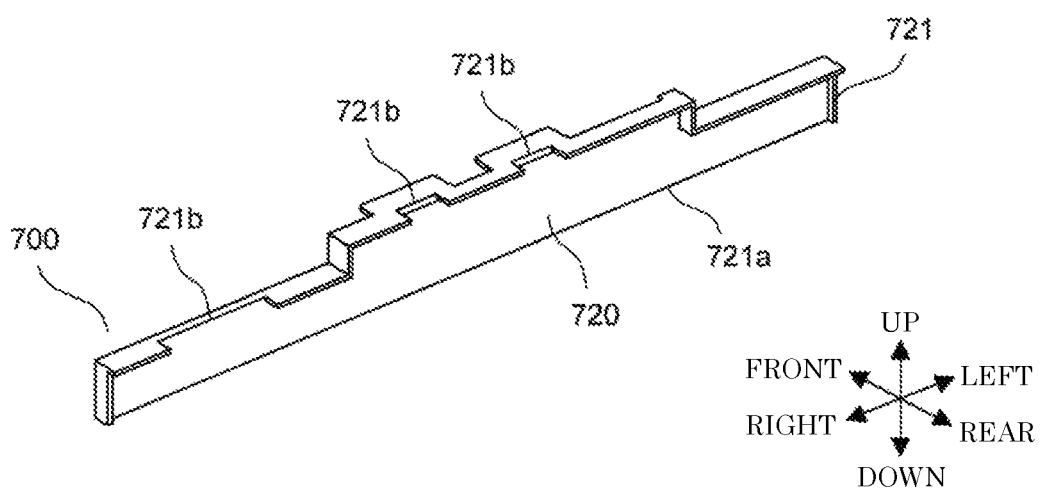
FIG. 4C is a rear perspective view illustrating an insulating plate according to the exemplary embodiment.

FIG. 4A is a front exploded perspective view illustrating bus bar unit 50 according to the present exemplary embodiment. FIG. 4B is an enlarged perspective view illustrating first internal connection terminal 520 and second internal connection terminal 620 according to the present exemplary embodiment. FIG. 4C is a rear perspective view illustrating insulating plate 700 according to the present exemplary embodiment.

Bus bar unit 50 includes first external connection bus bar 500, second external connection bus bar 600, and insulating plate 700.

First external connection bus bar 500 made of a conductive material such as a copper plate includes first main body 510, four first internal connection terminals 520, and two first external connection terminals 530. First external connection bus bar 500 is formed by, for example, cutting out and bending of one copper plate as appropriate, and thus first main body 510, first internal connection terminals 520, first external connection terminals 530 are integrally formed.

First main body 510 has a slender plate shape in which a width in the left-right direction of upper portion 510b is narrower than that of lower portion 510a. Four first internal connection terminals 520 are formed at predetermined intervals at a lower end edge of first main body 510. First internal connection terminal 520 protrudes downward, and the width of a tip of first internal connection terminal 520 is slightly narrowed to form insertion portion 521 (see FIG. 4B). A width of insertion portion 521 is approximately equal to a width of insertion hole 231 of first connection terminal 230 in first relay bus bar 200. Two first external connection terminals 530 are formed at predetermined intervals at an upper end edge of upper portion 510b of first main body 510. First external connection terminal 530 has a substantially L shape that extends slightly upward and then is bent, and extends frontward. Left-right widths and shapes of two first external connection terminals 530 are different from each other. Circular attachment hole 531 is formed in a tip portion of first external connection terminal 530.

Second external connection bus bar 600 includes second main body 610, four second internal connection terminals 620, and three second external connection terminals 630. Second external connection bus bar 600 is formed by, for example, cutting out and bending of one copper plate as appropriate, and thus second main body 610, second internal connection terminal 620, second external connection terminal 630 are integrally formed.

Second main body 610 has a slender plate shape in which the width in the left-right direction of upper portion 610b is narrower than that of lower portion 610a. Four second internal connection terminals 620 are formed at predetermined intervals at the lower end edge of second main body 610. Second internal connection terminal 620 protrudes downward, and the width of the tip of second internal connection terminal 620 is slightly narrowed to form insertion portion 621 (see FIG. 4B). A width of insertion portion 621 is approximately equal to a width of insertion hole 331 of second connection terminal 330 in second relay bus bar 300. Three second external connection terminals 630 are formed at predetermined intervals at the upper end edge of upper portion 610b and the upper end edge of lower portion 610a of second main body 610. Second external connection terminal 630 has a substantially L shape that extends slightly upward, and then is bent and extends frontward. A left-right width and a shape of each of two second external connection terminals 630 on the left side and a left-right width and a shape of one second external connection terminal 630 on the right side are different from each other. Circular attachment hole 631 is formed in a tip portion of second external connection terminal 630.

Insulating plate 700 is made of a resin insulating material such as polyphenylene sulfide, acryl, and silicon, and has a shape corresponding to the shapes of first external connection bus bar 500 and second external connection bus bar 600. The front surface of insulating plate 700 has first mounting recess 710 that is recessed into the shape of first main body 510 of first external connection bus bar 500. Portions 711a corresponding to four first internal connection terminal 520 and portions 711b corresponding to two first external connection terminal 530 are cut out at outer peripheral edge 711 of first mounting recess 710. The rear surface of insulating plate 700 has second mounting recess 720 that is recessed into the shape of second main body 610 of second external connection bus bar 600. Portion 721a at an entire lower edge and portions 721b corresponding to three second external connection terminals 630 are cut out at outer peripheral edge 721 of second mounting recess 720.

First external connection bus bar 500 is fitted into first mounting recess 710 of insulating plate 700 from the front side, and second external connection bus bar 600 is fitted into second mounting recess 720 of insulating plate 700 from the rear side. Bus bar unit 50 is assembled in this way.

At the lower end of bus bar unit 50, first internal connection terminals 520 and second internal connection terminals 620 are alternately arranged in the left-right direction (longitudinal direction of bus bar unit 50) while insertion portions 521 of first internal connection terminals 520 and insertion portion 621 of second internal connection terminals 620 protrude downward from insulating plate 700. At an upper end of bus bar unit 50, first external connection terminals 530 and second external connection terminals 630 are alternately arranged in the left-right direction while protruding upward from insulating plate 700.

In bus bar unit 50, first main body 510 of first external connection bus bar 500 and second main body 610 of second external connection bus bar 600 overlap each other in the front-rear direction via insulating plate 700. Accordingly, similarly to overlapping portion 41 of capacitor element unit 40, inductance components are cancelled and thus the ESL in bus bar unit 50 can be reduced.

Capacitor assembly 10 is assembled with four capacitor element units 40 and bus bar unit 50.

Figure 5A:
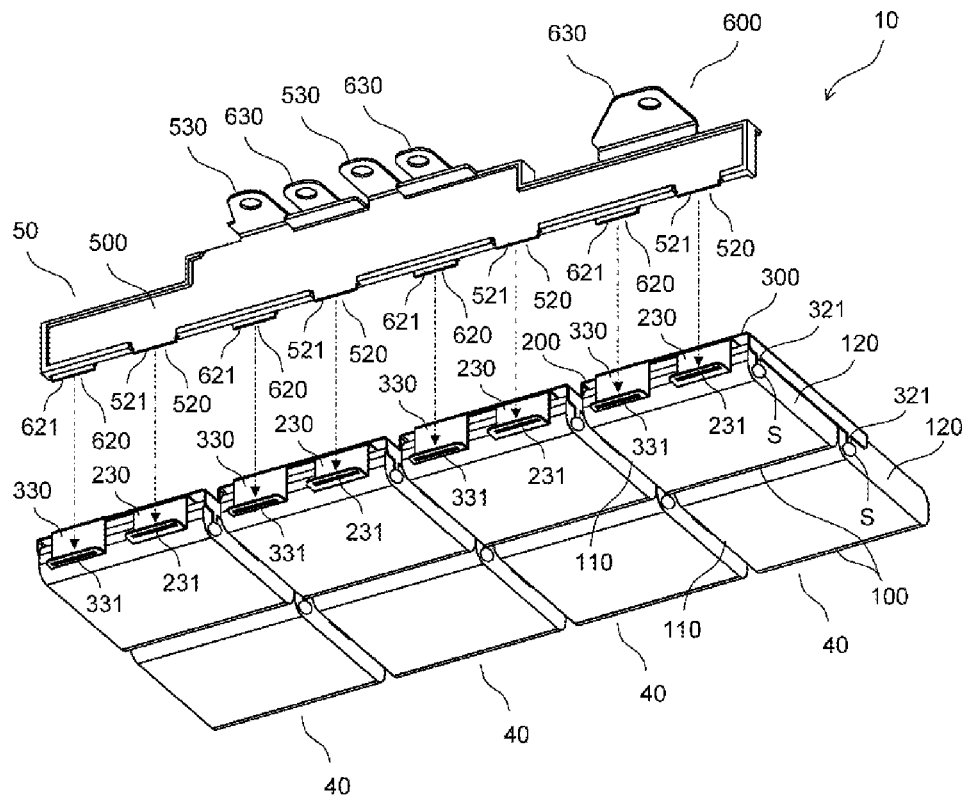
FIGS. 5A and 5B are views for illustrating assembly of a capacitor assembly according to the exemplary embodiment.
Figure 5B:
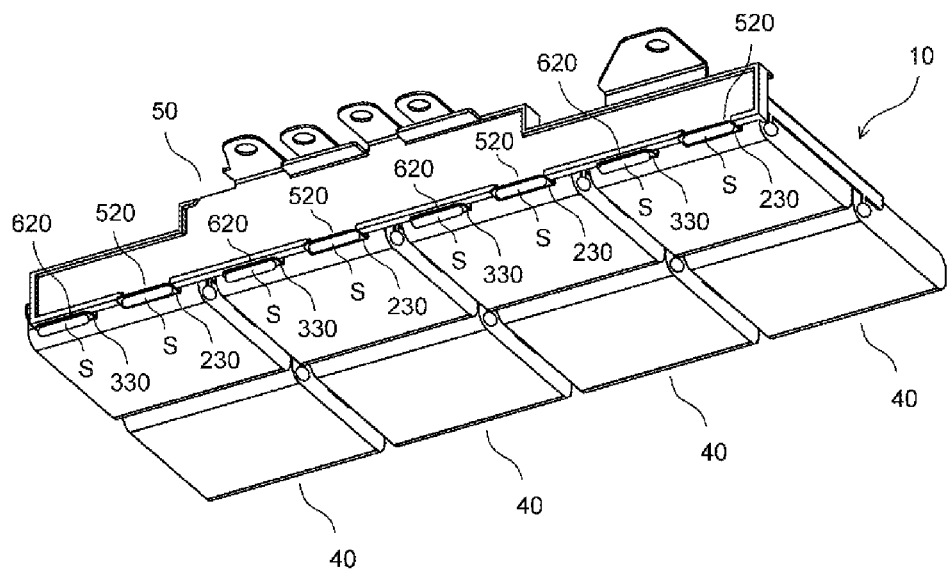

FIGS. 5A and 5B are views for illustrating assembly of capacitor assembly 10 according to the present exemplary embodiment.

First, as shown in FIG. 5A, four capacitor element units 40 are arrayed in the left-right direction such that end-surface electrodes 110, 120 of respective capacitor elements 100 face each other. Here, in capacitor element unit 40, connection between electrode terminals 221 of first relay bus bar 200 and first end-surface electrodes 110 of front and rear capacitor elements 100 by soldering S have been already completed. And connection between electrode terminals 321 of second relay bus bar 300 and second end-surface electrodes 120 of front and rear capacitor elements 100 by soldering S have been already completed. Accordingly, a gap between two adjacent capacitor element units 40 is sufficiently small because it is not necessary to provide a working space for soldering between them.

First connection terminals 230 of four first relay bus bars 200 and second connection terminals 330 of four second relay bus bars 300 are alternately arranged in the left-right direction. Insertion portions 521 of first internal connection terminals 520 of first external connection bus bar 500 in bus bar unit 50 are inserted from above into insertion holes 231 of first connection terminals 230, respectively. Further, insertion portions 621 of second internal connection terminals 620 of second external connection bus bar 600 in bus bar unit 50 are inserted from above into insertion holes 331 of second connection terminals 330, respectively. Accordingly, first connection terminals 230 are connected to first internal connection terminals 520, and second connection terminals 330 are connected to second internal connection terminals 620.

Next, as shown in FIG. 5B, soldering is performed between first connection terminals 230 and first internal connection terminals 520, and second connection terminals 330 and second internal connection terminals 620. In this way, first connection terminals 230 and first internal connection terminals 520 are fixed to each other by soldering S and electrically connected. Further, second connection terminals 330 and second internal connection terminals 620 are fixed to each other by soldering S and electrically connected. Capacitor assembly 10 is completed in this way.

Note that in capacitor assembly 10, a first bus bar is constituted by first relay bus bar 200 and first external connection bus bar 500. The first bus bar includes electrode terminals 221 of electrode connecting parts, which are connected to first end-surface electrodes 110 of capacitor elements 100, at one end and first external connection terminals 530 at another end. Similarly, a second bus bar is constituted by second relay bus bar 300 and second external connection bus bar 600. The second bus bar includes electrode terminals 321 of electrode connecting parts, which are connected to second end-surface electrodes 120 of capacitor elements 100, at one end and second external connection terminals 630 at another end.

Capacitor assembly 10 is housed in case 20. Four capacitor element units 40 are arrayed in the left-right direction in case 20. Flat surface 103a on the lower side in peripheral surface 103 of each capacitor element 100 faces the bottom surface of case 20. First connection terminals 230 are connected to first internal connection terminals 520, and second connection terminals 330 are connected to second internal connection terminals 620 in case 20.

Case 20 housing capacitor assembly 10 is filled with molten filling resin 30. Filling resin 30 is, for example, epoxy that is a thermosetting resin. After case 20 is heated and filling resin 30 is hardened, film capacitor 1 is completed as shown in FIG. 1A.

Film capacitor 1 is mounted to external equipment (device) such as vehicle inverter equipment. At this time, attachment tabs 21 of case 20 are fixed to attachment portions of the external equipment with screws and the like. External terminals (not shown) from the external equipment are then electrically connected to first external connection terminals 530 and second external connection terminals 630 corresponding to the respective external terminals through screwing using attachment holes 531, 631.

Effects of Exemplary Embodiment

As described above, the present exemplary embodiment exerts the following effects.

Before four capacitor elements 100 are arrayed in left and right direction such that end-surface electrodes 110, 120 of respective capacitor elements 100 face each other, electrode terminals 221 of first relay bus bars 200 and electrode terminals 321 of second relay bus bar 300 can be respectively connected, by soldering S, to first end-surface electrodes 110 and second end-surface electrodes 120 of capacitor elements 100. Hence, it is not necessary to provide the gap for the working space of soldering between two end-surface electrodes 110, 120 facing each other. Accordingly, capacitor elements 100 of a number according to the necessary capacitance can be arranged in case 20 whose shape and size are restricted.

Further, when electrode terminals 221, 321 are connected to first end-surface electrodes 110 and second end-surface electrodes 120, respectively, by soldering, first relay bus bar 200 and second relay bus bar 300, which are relatively large parts, are handled instead of electrode terminals 221, 321. Hence, electrode terminals 221, 321 can be easily connected to first end-surface electrodes 110 and second end-surface electrodes 120, respectively. As a result, capacitor assembly 10 can be easily assembled, which accordingly enables easy assembly of film capacitor 1.

Further, first connection terminals 230 are connected to first internal connection terminals 520, and second connection terminals 330 are connected to second internal connection terminals 620 in case 20. Thus, filling resin 30 protects the connecting parts. As a results, corrosion and the like are less likely to occur in the connecting parts, and reliability of film capacitor 1 is enhanced.

Further, capacitor element unit 40 is provided with overlapping portion 41, in which first main body 210 of first relay bus bar 200 and second main body 310 of second relay bus bar 300 overlap each other. Hence, an equivalent series inductance (ESL) can be reduced in capacitor element unit 40, which accordingly enables reduction of the ESL of film capacitor 1.

Further, in capacitor element unit 40, front first route L1F and front second route L2F, and rear first route L1R and rear second route L2R, which are the main routes for current flows, intersect with each other in overlapping portion 41. As a result, the effect of cancelling the inductance component in overlapping portion 41 can be enhanced, and the reduction effect of the ESL in capacitor element unit 40 is enhanced.

Further, in first relay bus bar 200 and second relay bus bar 300, first main body 210 and second main body 310 are formed such that overlapping portion 41 does not exist at the rear end parts of first main body 210 and second main body 310. As a result, the sizes of first relay bus bar 200 and second relay bus bar 300 are unlikely to wastefully increase, which enables reduction of the material cost and weight of first relay bus bar 200 and second relay bus bar 300.

Although the exemplary embodiment of the present disclosure has been described above, the present disclosure is not limited to the exemplary embodiment described above and application examples of the present disclosure can include various modifications in addition to the above exemplary embodiment.

For example, in the exemplary embodiment described above, electrode terminals 221 of first relay bus bar 200 and electrode terminals 321 of second relay bus bar 300 are connected to first end-surface electrodes 110 and second end-surface electrodes 120 of capacitor elements 100 by soldering. However, joining can be performed by other joining methods such as welding. Note that in a case where a different joining method is adopted, electrode connecting parts other than electrode terminals 221, 321 may be provided in first relay bus bar 200 and second relay bus bar 300.

Further, in the exemplary embodiment described above, two capacitor elements 100 are used for one capacitor element unit 40. However, one capacitor element 100 or three or more capacitor elements 100 may be used for one capacitor element unit 40.

Further, in the exemplary embodiment described above, four capacitor element units 40 are used for film capacitor 1. However, as long as capacitor element units 40 are plural, capacitor element units 40 of any number may be used according to the necessary capacitance.

Further, in the exemplary embodiment described above, one of each of electrode terminals 221, 321 is provided in first relay bus bar 200 and second relay bus bar 300 with respect to one capacitor element 100. However, two or more of each of electrode terminals 221, 321 may be provided. For example, when two of each of electrode terminals 221, 321 are provide, these two electrode terminals may be provided close to each other and connected to the ends (close to curved surfaces 103b) on the front side of first end-surface electrode 110 and second end-surface electrode 120 of front and rear capacitor elements 100.

Further, in the exemplary embodiment described above, capacitor element 100 is formed by stacking of two metalized films in each of which aluminum is deposited on the dielectric film, and winding or laminating of the stacked metalized films. Alternatively, capacitor element 100 may be formed by stacking of an insulating film and a metalized film that includes a dielectric film and aluminum deposited on both sides of the dielectric film, and winding or laminating of the stacked insulating film and the metalized film. In the exemplary embodiment described above, film capacitor 1 is used as an example of the capacitor of the present disclosure. However, the present disclosure may be applied to capacitors other than film capacitor 1.

In addition, various modifications can be appropriately made to the exemplary embodiment of the present disclosure within the scope of the technical idea disclosed in the claims.

It should be noted that, in the description of the above-described exemplary embodiment, a term indicating a direction, such as "upward" or "downward", indicates a relative direction that only depends on a relative positional relationship of constituent members, and does not indicate an absolute direction, such as a vertical direction or a horizontal direction.

The present disclosure is useful for capacitors for use in various types of electronic devices, electrical devices, industrial equipment, electric components for vehicles, and the like.

What is claimed is:

1. A capacitor comprising:
a plurality of capacitor element units each including a relay bus bar and a capacitor element having a peripheral surface and two end surfaces facing each other, the capacitor element including an electrode disposed on at least one of the two end surfaces, the relay bus bar including an electrode connecting part connected to the electrode of the capacitor element and a connection terminal disposed to face the peripheral surface of the capacitor element;
a case that houses the plurality of capacitor element units;
a filling resin that fills an interior of the case; and
an external connection bus bar that includes an internal connection terminal and an external connection terminal, the internal connection terminal being disposed in the case and connected to the connection terminal, the external connection terminal being exposed from the filling resin and configured to connect to an external terminal, wherein
the plurality of capacitor element units are arrayed in the case along a first direction parallel to a bottom surface of the case so that the electrode of the capacitor element in a first capacitor element unit among the plurality of capacitor element units faces the electrode of the capacitor element in a second capacitor element unit among the plurality of capacitor element units, the first capacitor element unit and the second capacitor element unit being adjacent to each other.

2. The capacitor according to claim 1, wherein:
each of the plurality of capacitor element units includes a plurality of capacitor elements each being the capacitor element, the plurality of capacitor elements being arranged in a second direction that is orthogonal to the first direction and is parallel to the bottom surface of the case, and
the relay bus bar includes a plurality of electrode connecting parts each being the electrode connecting part, the plurality of electrode connecting parts being respectively connected to the plurality of capacitor elements at the electrode of each of the plurality of capacitor elements.

3. The capacitor according to claim 1, wherein:
the capacitor element includes a first end-surface electrode disposed on one of the two end surfaces of the capacitor element and a second end-surface electrode disposed on another one of the two end surfaces, each of the first end-surface electrode and the second end-surface electrode being the electrode of the capacitor element,
each of the plurality of capacitor element units includes a first relay bus bar and a second relay bus bar, the first relay bus bar including a first electrode connecting part connected to the first end-surface electrode and a first connection terminal connected to the external connection bus bar, the second relay bus bar including a second electrode connecting part connected to the second end-surface electrode and a second connection terminal connected to the external connection bus bar, each of the first relay bus bar and the second relay bus bar being the relay bus bar, each of the first electrode connecting part and the second electrode connecting part being the electrode connecting part, each of the first connection terminal and the second connection terminal being the connection terminal, and
each of the plurality of capacitor element units includes an overlapping portion where the first relay bus bar and the second relay bus bar overlap each other above the peripheral surface of the capacitor element.

4. The capacitor according to claim 3, wherein:
a first route is defined as a shortest route, in the first relay bus bar, between a first connection point and a second connection point, the first connection point being a position where the first electrode connecting part is connected to the first end-surface electrode, the second connection point being a position where the first connection terminal is connected to the external connection bus bar,
a second route is defined as a shortest route, in the second relay bus bar, between a third connection point and a fourth connection point, the third connection point being a position where the second electrode connecting part is connected to the second end-surface electrode, the fourth connection point being a position where the second connection terminal is connected to the external connection bus bar, and
the first route and the second route intersect with each other in the overlapping portion.

5. The capacitor according to claim 4, wherein:
the peripheral surface of the capacitor element includes two flat surfaces parallel to each other, the plurality of capacitor element units being arrayed in the case so that one of the two flat surfaces faces the bottom surface of the case,
the first relay bus bar includes a first main body disposed along another one of the two flat surfaces, and the second relay bus bar includes a second main body disposed along the another one of the two flat surfaces, the overlapping portion being provided in the first main body and the second main body,
in the first relay bus bar, the first connection terminal is disposed close to the second end-surface electrode, the first route passing through the first main body, and
in the second relay bus bar, the second connection terminal is disposed close to the first end-surface electrode, the second route passing through the second main body.

6. The capacitor according to claim 5, wherein:
the peripheral surface of the capacitor element includes a curved surface that connects the two flat surfaces,
in the first relay bus bar, the first connection terminal is disposed to face the curved surface, the first connection point being located on a side close to the curved surface in the first end-surface electrode, and
in the second relay bus bar, the second connection terminal is disposed to face the curved surface, the third connection point being located on a side close to the curved surface in the second end-surface electrode.

7. The capacitor according to claim 5, wherein:
each of the plurality of capacitor element units includes a plurality of capacitor elements each being the capacitor element, the plurality of capacitor elements being arranged in the second direction that is orthogonal to the first direction and is parallel to the bottom surface of the case,
the first relay bus bar includes a plurality of first electrode connecting parts each being the first electrode connecting part, the plurality of first electrode connecting parts being respectively connected to the plurality of capacitor elements at the first end-surface electrode of each of the plurality of capacitor elements,
the second relay bus bar includes a plurality of second electrode connecting parts each being the second electrode connecting part, the plurality of second electrode connecting parts being respectively connected to the plurality of capacitor elements at the second end-surface electrode of each of the plurality of capacitor elements, and
the overlapping portion does not exist near an end of a capacitor element farthest from the first connection terminal and the second connection terminal among the plurality of capacitor elements.

* * * * *